United States Patent
Saeedi et al.

(10) Patent No.: US 11,310,496 B2
(45) Date of Patent: Apr. 19, 2022

(54) DETERMINING QUALITY VALUES FOR BLOCKS OF ENCODED VIDEO

(71) Applicant: ATI Technologies ULC, Markham (CA)

(72) Inventors: Mehdi Saeedi, Markham (CA); Boris Ivanovic, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/366,959

(22) Filed: Mar. 27, 2019

(65) Prior Publication Data

US 2020/0314422 A1    Oct. 1, 2020

(51) Int. Cl.
*H04N 19/00* (2014.01)
*H04N 19/117* (2014.01)
*H04N 19/196* (2014.01)
*H04N 19/154* (2014.01)
*H04N 19/176* (2014.01)

(52) U.S. Cl.
CPC ......... *H04N 19/117* (2014.11); *H04N 19/154* (2014.11); *H04N 19/176* (2014.11); *H04N 19/198* (2014.11)

(58) Field of Classification Search
CPC .. H04N 19/117; H04N 19/154; H04N 19/176; H04N 19/198
See application file for complete search history.

(56) References Cited

U.S. PATENT DOCUMENTS

| | | | | |
|---|---|---|---|---|
| 2012/0177121 | A1* | 7/2012 | Tripathi | H04N 19/132 375/240.16 |
| 2012/0275514 | A1* | 11/2012 | Leontaris | H04N 19/105 375/240.02 |
| 2015/0373328 | A1* | 12/2015 | Yenneti | H04N 19/12 375/240.03 |
| 2017/0070745 | A1* | 3/2017 | Lee | H04N 19/61 |
| 2017/0337711 | A1* | 11/2017 | Ratner | H04N 19/176 |
| 2018/0220129 | A1* | 8/2018 | Peng | H04N 19/154 |
| 2018/0288356 | A1* | 10/2018 | Ray | H04N 19/124 |

OTHER PUBLICATIONS

Krizhevsky, A. et al., "ImageNet Classification with Deep Convolutional Neural Networks," in the Proceedings of Advances in Neural Information Processing Systems, pp. 1097-1105, Lake Tahoe, NV, USA, Dec. 3-8, 2012.

* cited by examiner

*Primary Examiner* — Zhihan Zhou
(74) *Attorney, Agent, or Firm* — Volpe Koenig

(57) ABSTRACT

A technique for determining a quality value for a subject block of encoded video is provided. Contributing blocks, of the same frame and/or different frames of the subject block, are determined by identifying blocks likely to be a part of the same moving object or background as the subject block. A spatial and/or temporal filter is then applied to the quality values of the contributing blocks and an initial quality value of the subject block. With a spatial filter, quality values for contributing blocks from the same frame are combined and used to modify the quality value of the subject block. With a spatial filter, a temporal characteristic quality value for contributing blocks of one or more other frames (such as the immediately previous frame) is determined and then combined with a quality value representative of the subject block.

20 Claims, 7 Drawing Sheets

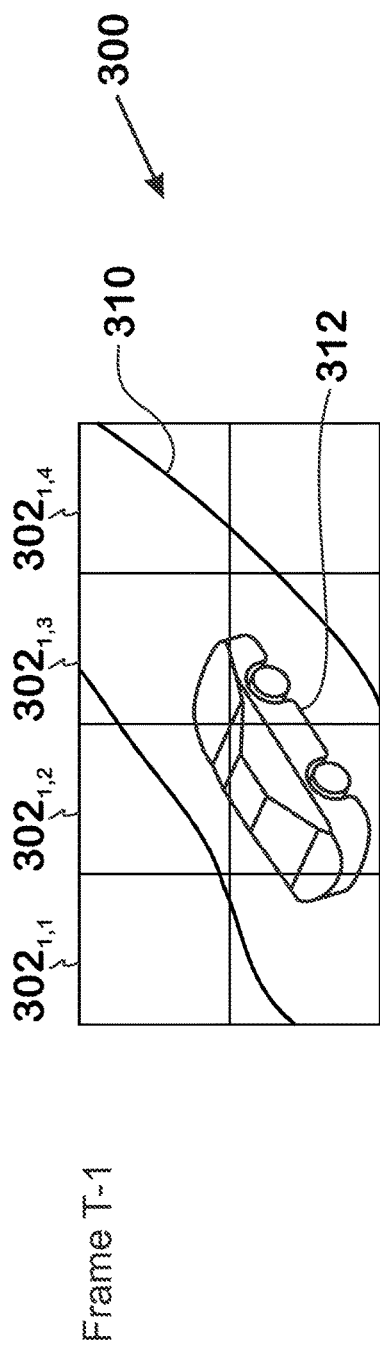
FIG. 3A
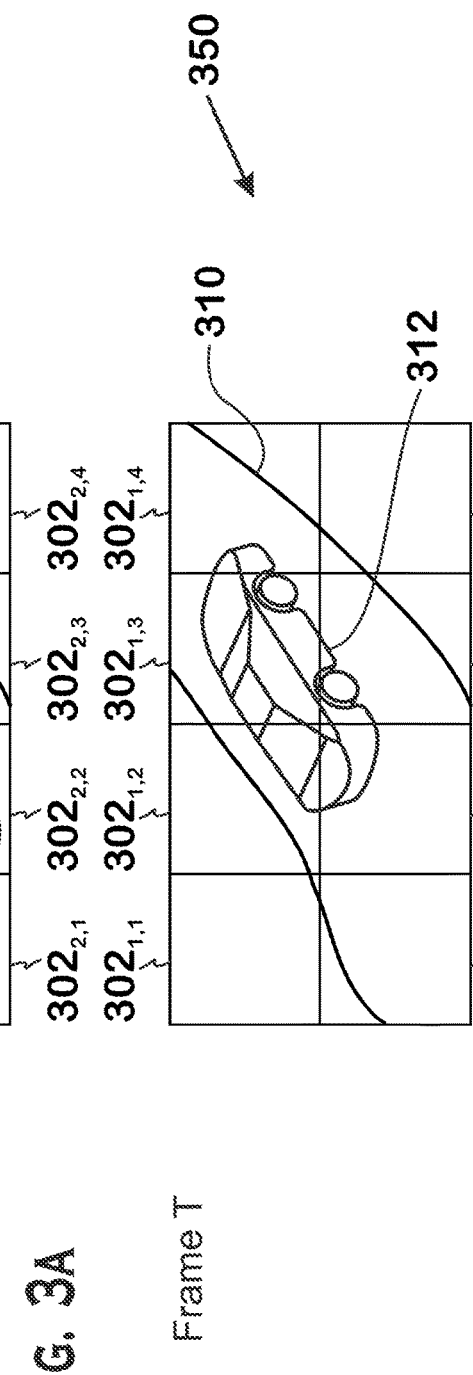
FIG. 3B
FIG. 3C

Frame T-1

Frame T

Initial Quality values (Higher values mean lower quality)

DETERMINING QUALITY VALUES FOR BLOCKS OF ENCODED VIDEO

BACKGROUND

One aspect of video encoding involves conversion of pixels in a frame of video into groups of pixels, often known as blocks. A lossy compression step downgrades the fidelity of the representation of the blocks. The amount of data used for any particular block is based at least in part on a quality value set for that block. It is important to set quality values for different blocks in a matter that produces good visual results.

BRIEF DESCRIPTION OF THE DRAWINGS

A more detailed understanding may be had from the following description, given by way of example in conjunction with the accompanying drawings wherein:

FIGS. 3A-3C illustrate details related to abrupt changes in quality values for objects moving through different blocks, according to an example;

DETAILED DESCRIPTION

A technique for determining a quality value for a subject block of encoded video is provided. Contributing blocks, of the same frame and/or different frames of the subject block, are determined by identifying blocks likely to be a part of the same moving object or background as the subject block. A spatial and/or temporal filter is then applied to the quality values of the contributing blocks and an initial quality value of the subject block. With a spatial filter, quality values for contributing blocks from the same frame are combined and used to modify the quality value of the subject block. With a temporal filter, a temporal characteristic quality value for contributing blocks of one or more other frames (such as the immediately previous frame) is determined and is then combined with a quality value representative of the subject block.

Figure 1:
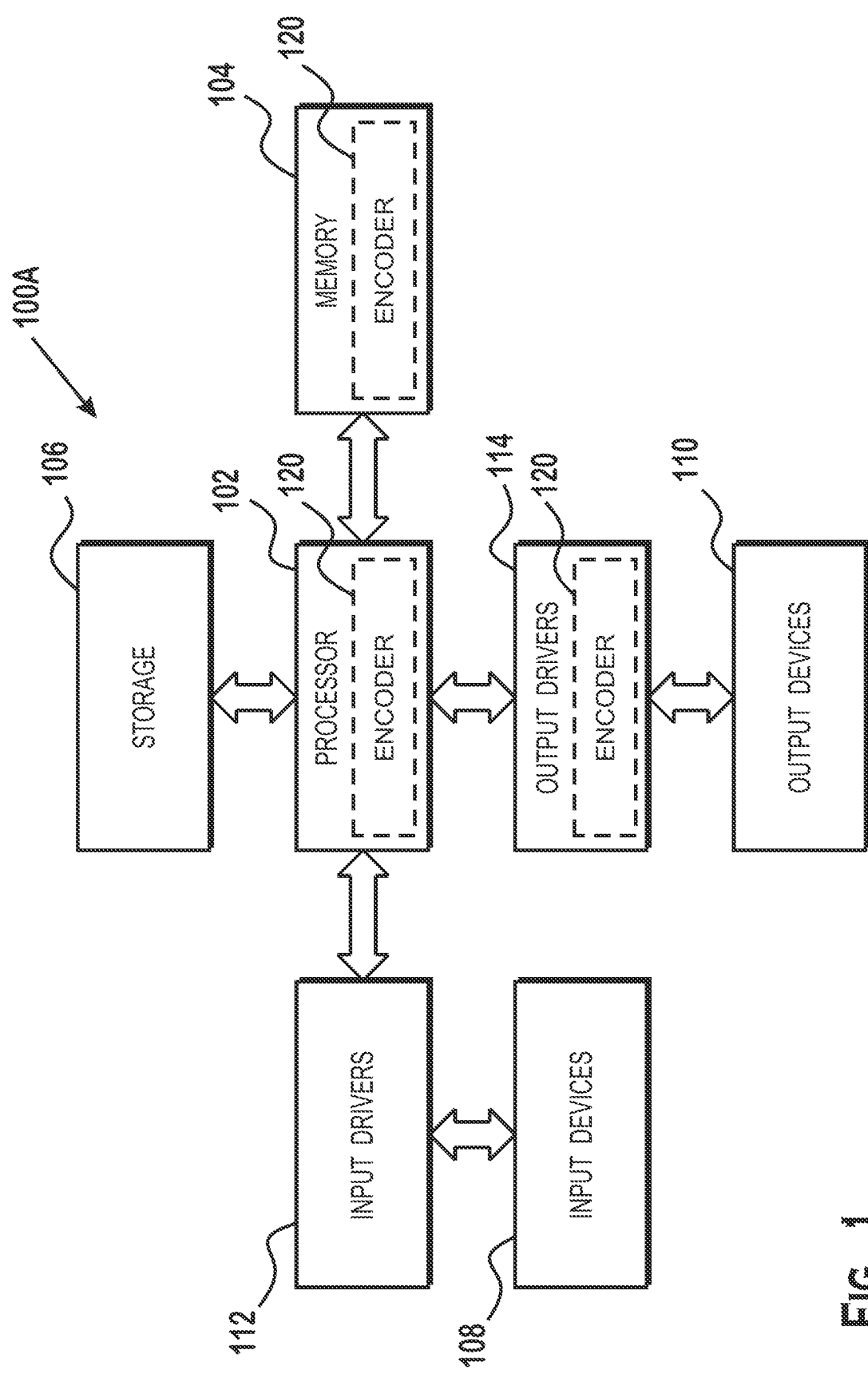
FIG. 1 is a block diagram of an example device in which aspects of the present disclosure are implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 optionally includes an input driver 112 and an output driver 114. It is understood that the device 100 optionally includes additional components not shown in FIG. 1.

The processor 102 includes one or more of: a central processing unit (CPU), a graphics processing unit (GPU), a CPU and GPU located on the same die, or one or more processor cores, wherein each processor core is a CPU or a GPU. The memory 104 is located on the same die as the processor 102 or separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include one or more of a keyboard, a keypad, a touch screen, a touch pad, a detector, a microphone, an accelerometer, a gyroscope, or a biometric scanner. The output devices 110 include one or more of a display, a speaker, a printer, a haptic feedback device, one or more lights, or an antenna.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110.

The network interface card ("NIC") 118 provides an interface to other devices via a computer network. The NIC 118 is configured to communicate with an external device via a networking protocol such as Ethernet, Wi-Fi, Infini-Band, or other protocols. The accelerators 116 include one or more devices that are configured to accept and execute processing tasks. These devices include one or more of a graphics processing unit ("GPU"), field programmable gate array ("FPGA"), processing-in-memory chip ("PIM"), application-specific integrated circuit ("ASIC"), or other device.

A video encoder 120 is shown in two different alternative forms. In a first form, the encoder 120 is software that is stored in the memory 104 and that executes on the processor 102 as shown. In a second form, the encoder 120 is at least a portion of a hardware graphics engine that resides in output drivers 114. In other forms, the encoder 120 is a combination of software and hardware elements, with the hardware residing, for example, in output drivers 114, and the software executed on, for example, the processor 102.

Figure 2A:
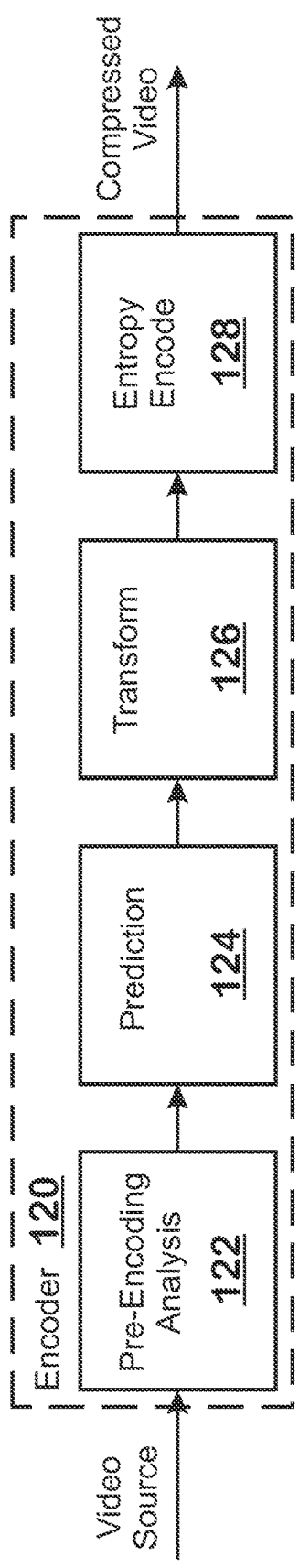
FIG. 2A presents a detailed view of an encoder, according to an example.

FIG. 2A presents a detailed view of the encoder 120 of FIG. 1, according to an example. The encoder 120 accepts source video, encodes the source video to produce compressed video (or "encoded video"), and outputs the compressed video. Embodiments of the encoder 120 may include blocks other than those shown. The encoder 120 includes a pre-encoding analysis block 122, a prediction block 124, a transform block 126, and an entropy encode block 128. In some alternatives, the encoder 120 implements one or more of a variety of known video encoding standards (such as MPEG2, H.264, or other standards), with the prediction block 124, transform block 126, and entropy encode block 128 performing respective portions of those standards. In other alternatives, the encoder 120 implements a video encoding technique that is not a part of any standard.

The prediction block 124 performs prediction techniques to reduce the amount of information needed for a particular frame. Various prediction techniques are possible. One example of a prediction technique is a motion prediction based inter-prediction technique, where a block in the current frame is compared with different groups of pixels in a different frame until a match is found. Various techniques for finding a matching block are possible. One example is a sum of absolute differences technique, where characteristic values (such as luminance) of each pixel of the block in the current block is subtracted from characteristic values of corresponding pixels of a candidate block, and the absolute values of each such difference are added. This subtraction is performed for a number of candidate blocks in a search window. The candidate block with a score deemed to be the "best," such as by having the lowest sum of absolute differences, is deemed to be a match. After finding a matching block, the current block is subtracted from the matching block to obtain a residual. The residual is further encoded by the transform block 126 and the entropy encode block 128 and the block is stored as the encoded residual plus the motion vector in the compressed video.

The transform block 126 performs an encoding step which is typically lossy, and converts the pixel data of the block into a compressed format. An example transform that is typically used is a discrete cosine transform (DCT). The discrete cosine transform converts the block into a sum of weighted visual patterns, where the visual patterns are distinguished by the frequency of visual variations in two different dimensions. The weights afforded to the different patterns are referred to as coefficients. These coefficients are quantized and are stored together as the data for the block. Quantization is the process of assigning one of a finite set of values to a coefficient. The total number of values that are available to define the coefficients of any particular block is defined by the quantization parameter (QP). A higher QP means that the step size between values having unity increment is greater, which means that a smaller number of values are available to define coefficients. A lower QP means that the step size is smaller, meaning that a greater number of values are available to define coefficients. A lower QP requires more bits to store, because more bits are needed for the larger number of available coefficient values, and a lower QP requires fewer bits. Visually, a higher QP is associated with less detail and a lower QP is associated with more detail. Although the concept of QP is defined herein, the term "quality value" will be used herein to generally refer to a value indicating the amount of data afforded for encoding a block, and thus the visual quality with which a block is represented in the encoded video. Numerically, quality value can be thought of as a ranking. Thus, a higher quality value means that a block is afforded a lower number of bits and is thus encoded with lower quality and a lower quality value means that a block is afforded a higher number of bits and is thus encoded with higher quality. It should be understood that although quality values are described herein as a "ranking" (with a lower number meaning higher quality and a higher number meaning lower quality), it is possible for other types of quality values to be used. For example, it is possible to use quality values where a higher number means a higher quality and a lower number means a lower quality.

The entropy encode block 128 performs entropy coding on the coefficients of the blocks. Entropy coding is a lossless form of compression. Examples of entropy coding include context-adaptive variable-length coding and context-based adaptive binary arithmetic coding. The entropy coded transform coefficients describing the residuals, the motion vectors, and other information such as per-block QPs are output and stored or transmitted as the encoded video.

The pre-encoding analysis block 122 performs analysis on the source video to adjust parameters used during encoding. One operation performed by the pre-encoding analysis block 122 includes analyzing the source video to determine what quality values should be afforded to the blocks for encoding. Additional details about determining quality values for encoding blocks are provided below.

Figure 2B:
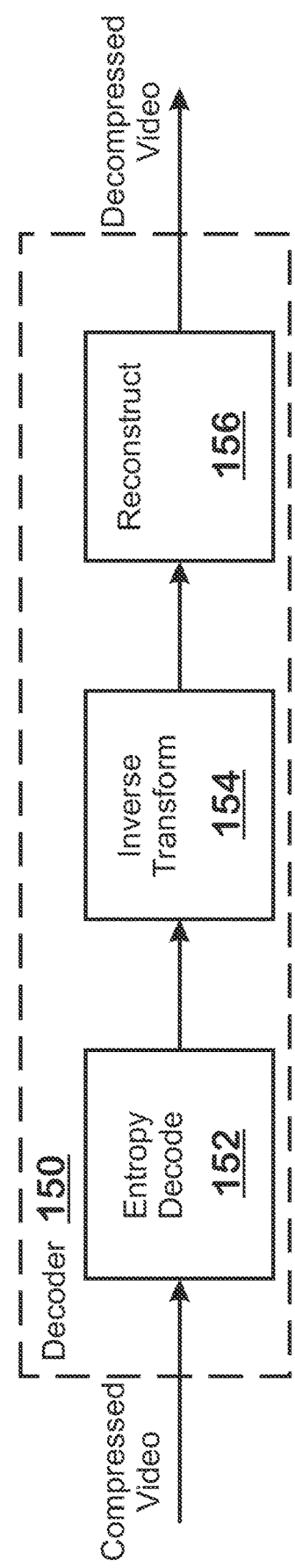
FIG. 2B presents a detailed view of a decoder, according to an example.

FIG. 2B represents a decoder 150 for decoding compressed data generated by an encoder such as the encoder 120, according to an example. The decoder 160 includes an entropy decoder 152, an inverse transform block 154. The entropy decoder 152 converts the entropy encoded information in the compressed video, such as compressed quantized transform coefficients, into raw (non-entropy-coded) quantized transform coefficients. The inverse transform block 154 converts the quantized transform coefficients into the residuals. The reconstructed block 156 obtains the predicted block based on the motion vector and adds the residuals to the predicted block to reconstruct the block.

Note that the operations described for FIGS. 2A and 2B only represent a small subset of the operations that encoder and decoders may use.

As described above, in any particular frame, the transform block 126 obtains quality values for blocks. A quality value assigning unit, such as the pre-encoding analysis block 122, or another unit (such as any hardware unit, or software executing on a processor in the encoder 122 or external to the encoder 122, such as within the system 100), determines these quality values. These quality values are chosen based on a variety of techniques. In one example technique, the quality value assigning unit sets the quality value the same for each block in a sequence of frames. In another example technique, the quality value assigning unit sets the quality value as the same for each block in a frame, but modifies the quality value assigned to blocks in different frames. In another example technique, the quality value assigning unit sets the quality value as a different value for different blocks in a frame. The quality value assigning unit assigns quality values to the blocks based on one or both of an input desired quality, an input desired bitrate, or a combination of the two. This technique of assigning quality values based on either or both of the desired quality and desired bitrate is referred to as a rate control system. In such a system, the inputs are budget and content and the output is the quality value for a block, frame, scene, or content (portion of a frame). In an example budget technique, the quality value assigning unit receives or determines a budget as a number of bits for a frame or a number of frames. The quality value assigning unit divides the budget to each of the blocks in a frame and sets the quality value according to the assigned budget. After encoding, the quality value assigning unit determines the number of bits that the encoding actually took and adjusts the budget up or down to meet the desired budget. In some techniques, quality value can be further adjusted on a per-block basis based on instantaneous (or local) budget or visual importance, which can consider factors such as contrast, the degree to which high frequencies exist in an area of a frame, noise, entropy, local motion, or local similar to surroundings, to adjust the quality values for different blocks.

One issue with typical techniques for setting quality values is that as objects pass through different blocks, those objects may be encoded with different quality values. This difference in quality values across different frames can lead to a temporal variation in visual fidelity for the same object across multiple frames. In an example, an object with a large amount of visually important detail in a particular frame occupies at least one block. Because of the important detail, the object is encoded with a low quality value in that block (and thus high quality to keep most of the details). A small portion of that object movies into an adjacent block in the next frame. Because most of that block is low detail background elements, that block is encoded with a high quality value (thus low quality to save bits). Thus, the portion of that object that moved into the block changes from being shown in high detail in one frame to being shown in low detail in the next frame.

FIGS. 3A-3C illustrate details related to abrupt changes in quality values for objects moving through different blocks, according to an example. Eight blocks in are shown in two time-adjacent frames frame T-1 300 and frame T 350. In frame T-1 300, four blocks 302 are shown in row 1 and four blocks 302 are shown in row 2. A car 312 traveling on a road 310 is also shown. Frame T includes blocks 304, including four blocks 304 in row 1 and four blocks 304 in row 2. Each block in frame T is in the same location in the frame as the similarly numbered blocks in frame T-1. In frame T, the car 312 has moved along the road 310 as compared with frame T-1.

Chart 370 shows the quality values afforded to each block in each frame. A lower number means the block is encoded with higher quality and a higher number means the block is encoded with lower quality. The quality values may be determined according to any known technique, such as those based on rate control, described above, and may be based on any of a variety of factors, such as visual perception and bit budget, as described above. The above described issue of changing quality values for the same object can best be seen in blocks 1,3 and 2,3 in frame T-1, as well as block 1,4 in frame T. Specifically, block 1,3 and 2,3 in T-1 have nearly similar quality values of 10 and 9, because these blocks include portions of the car 312, which has some detail as compared with the background (e.g., road, grass) which has less detail and might have quality values of 18, for example. However, in frame T, block $302_{1,4}$ is shown as having quality value of 16, because only a small portion of the car 312 is extended into that block. However, that portion, the tip of the car is represented with relatively large detail in frame T-1 and then with relatively small detail in frame T. Thus there is an abrupt change in quality for the object.

Figure 4:
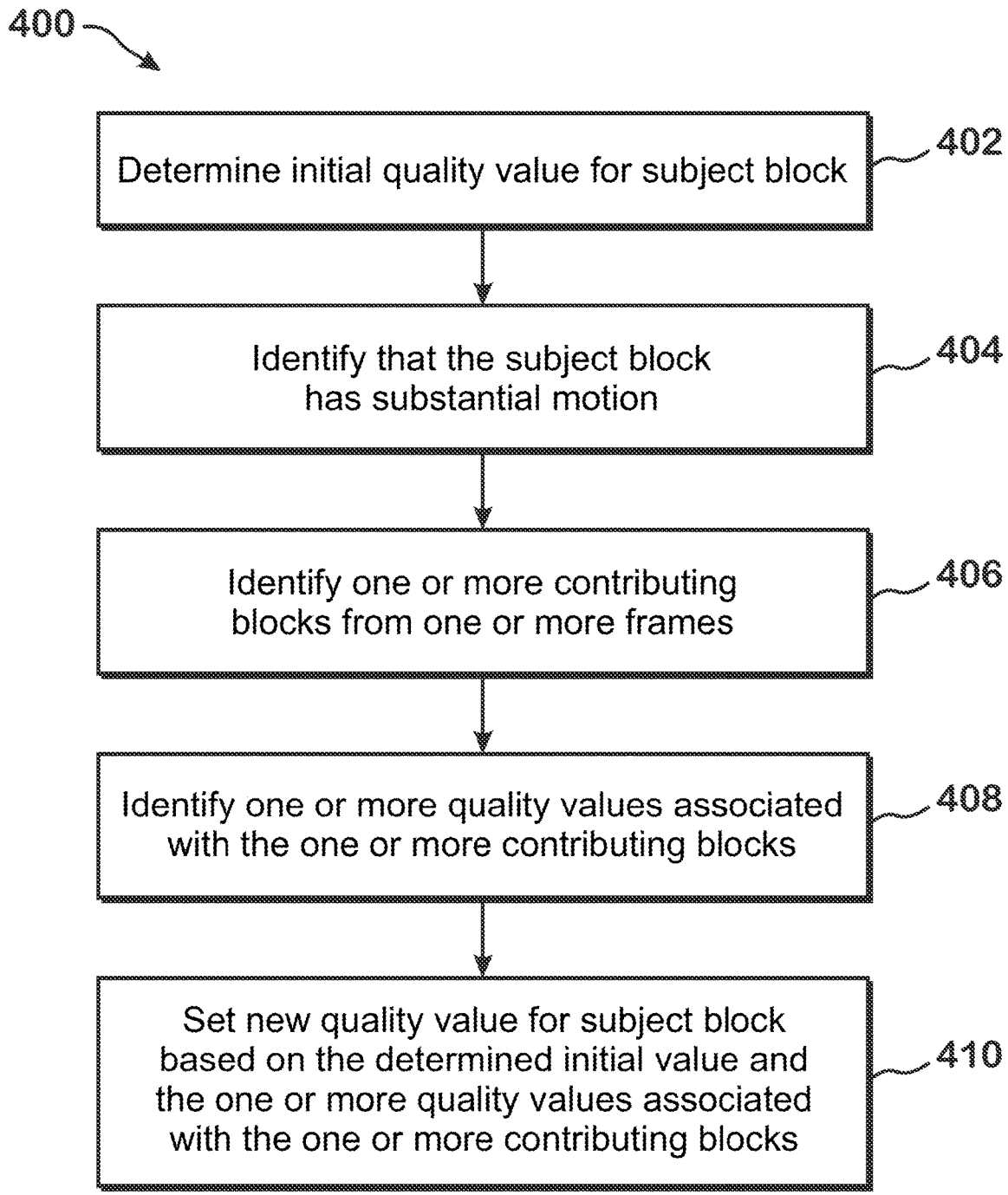
FIG. 4 presents a method 400 for determining the quantization parameters for blocks of a frame, according to an example.

To address this issue, FIG. 4 presents a method 400 for determining the quality values for blocks of a frame, according to an example. Although described with respect to the system of FIGS. 1 and 2A, those of skill in the art will understand that any system, configured to perform the steps of the method 400 in any technically feasible order, falls within the scope of the present disclosure. The method is described for determining a quality value for a single block, but could be used to determine any number of quality values for any number of blocks.

The method 400 begins at step 402, where the pre-encoding analysis block 122 determines initial quality values for a block of a frame. These initial quality values represent quality values that would be determined without the techniques of this disclosure. A variety of techniques are known. In general, though, according to these techniques, a quality value is assigned to any particular block without consideration of the quality values of other blocks that might be part of the same object in the same frame or a different frame.

At step 404, the pre-encoding analysis block 122 determines that the block has substantial motion. The block may be considered to have substantial motion if the block has content that moves from a prior frame to the current frame. One way to determine that the block has substantial motion is by determining that the amplitude of the motion vector of the block is above a threshold. The threshold may be selected in any technically feasible manner. Conceptually, a block may have substantial motion if the block includes content that is moving with respect to a background or if the background is moving.

At step 406, the pre-encoding analysis block 122 identifies one or more contributing blocks from one or more frames. A contributing block is a block whose quality value will be blended with the quality value of the current block to determine a new quality value for the current block. Quality values from multiple contributing blocks may be blended with the quality value of the current block in this manner. In general, the contributing blocks are blocks from the same object as the current block. The same object may be either the background if the current block is a part of the background that is moving or may be a part of a foreground object if the current block contains a foreground object.

Several example techniques for the pre-encoding analysis block 122 to identify contributing blocks follow. In one technique, the pre-encoding analysis block 122 examines the frame of the block under analysis for contiguous blocks that have approximately the same motion vector magnitude and direction. "Approximately the same" means that the motion vector magnitude and direction are within a multiplier threshold of the magnitude and direction of the motion vector of the block under analysis under analysis (i.e., the motion vector for the block whose initial quality value is determined at step 402). In an example, the block under analysis contains a car. That block has a particular motion vector. The pre-encoding analysis block 122 examines the current frame for a contiguous section of blocks that have a motion vector that is approximately the same as the motion vector of the block under analysis. Then, the pre-encoding analysis block 122 obtains the contributing blocks as the blocks of the immediately previous frame pointed to by the motion vectors—in other words, the blocks that contain the source pixels of the blocks of the current frame, according to the motion vectors. These blocks of the immediately previous frame are identified as the contributing blocks.

In an alternative to the above technique, the blocks described above from the previous frame, as well as the blocks of the current frame having the approximately the same motion vectors as the current block are identified as the contributing blocks (i.e., both the blocks of the current frame having a similar motion vector to the block under analysis as well as the source blocks from the previous frame are identified as the contributing blocks). In another alternative, the motion vectors refer to a future frame, such as the immediately subsequent frame. Blocks of the subsequent frame from which the pixels are sourced for the current block and the blocks having substantially similar blocks to the current block are identified as contributing blocks. Either those blocks alone are contributing blocks or those blocks and the substantially similar blocks of the current frame are contributing blocks. In other variations, blocks from one or more frames other than the current frame, where the blocks are identified as including the same object as the current block via a motion vector technique, are identified as contributing blocks, either alone, or in combination with any other blocks identified as including the same object as the current block.

In another technique for identifying contributing blocks, the pre-encoding analysis block 122 performs semantic segmentation. Example semantic segmentation techniques are used to separate an object from its background, to find an object boundary, or to find all objects of the same type. A document that describes some semantic segmentation techniques is Krizhevsky, Alex, Ilya Sutskever, and Geoffrey E. Hinton. "ImageNet classification with deep convolutional neural networks." Advances in neural information processing systems. 2012, the contents of which are fully incorporated by reference as if set forth herein in its entirety. The pre-encoding analysis block 122 obtains an outline of the object based on the semantic segmentation and identifies, as contributing blocks, any of the blocks that are included within that outline, in one or more frames including the current frame and temporally neighboring frames. For frames other than the current frame, the pre-encoding analysis block 122 performs a semantic segmentation technique to identify the object with a similar shape as the object identified in the current frame. As with the motion vector-based techniques, in various examples, the pre-encoding analysis block 122 identifies blocks of the identified object, in one or more of the current frame, a previous frame, or a future frame, as the contributing blocks.

At step 408, the pre-encoding analysis block 122 identifies one or more quality values associated with the one or more contributing blocks. For contributing blocks of the current frame, the associated quality values are the initial quality values for those blocks. For contributing blocks of other frames, the associated quality values are the quality values actually used to encode those blocks (e.g., in the transform unit 126).

At step 410, the pre-encoding analysis block 122 filters the associated quality values for the contributing blocks with the initial quality value for the subject block to get a new quality value for the subject block. This new quality value is the quality value used to encode the block in the transform unit 126 of the encoder 120. In general, the pre-encoding analysis block 122 performs this filtering by adjusting the initial quality value based on the quality values for the contributing blocks, based on the concept that the quality values for the contributing blocks, taken together, characterize a designated quality value for the object represented in those contributing blocks (e.g., the car 312 in FIGS. 3A and 3B) as a whole. Thus, in some example techniques, the pre-encoding analysis block 122 adjusts the initial quality value to a number that is closer to a single characteristic quality value that characterizes the object.

In an example, the pre-encoding analysis block 122 derives a characteristic quality value from the quality values associated with the contributing blocks. Then, the pre-encoding analysis block 122 modifies the initial quality value of the subject block to be closer to that characteristic quality value. In some examples, the above characteristic value is an arithmetic mean of the quality values associated with the contributing blocks. In another example, the characteristic value is a weighted arithmetic mean of the quality values of the contributing blocks. In an example, different weights are assigned to different frames. In an example, one frame is assigned a 66% weight and a different frame is assigned a 34% weight. In another example of determining the characteristic value, the characteristic value is the maximum quality value of the quality values of the contributing blocks. In another example, the characteristic value is the minimum quality value of the quality values of the contributing blocks.

In another example, the pre-encoding analysis block 122 performs one or both of a spatial filter on the initial value and a temporal filter on the initial value to obtain a final quality value for the subject block. In general, a spatial filter is a filter that causes the quality values of characteristic blocks in the same frame as the subject block to affect the final quality value of the subject block. In general, a temporal filter is a filter that causes the quality values of characteristic blocks in other frames to affect the final quality value of the subject block. In one example, the pre-encoding analysis block 122 performs a spatial filter by calculating a spatial characteristic value based on all contributing blocks of the same frame, and the initial value. Then, the pre-encoding analysis block 122 assigns to the subject block, as a spatially filtered value, the spatial characteristic value. In some examples, the above spatial characteristic value is an arithmetic mean of the quality values associated with the contributing blocks in the same frame. In another example, the spatial characteristic value is a weighted arithmetic mean of the quality values of the contributing blocks in the same frame as the subject block. The weights may be determined in any technically feasible manner. In another example of determining the spatial characteristic value, the characteristic value is the maximum quality value of the quality values of the contributing blocks in the same frame. In another example, the spatial characteristic value is the minimum quality value of the quality values of the contributing blocks in the same frame.

In one example, the pre-encoding analysis block 122 performs a temporal filter by calculating a temporal characteristic value for contributing blocks of one or more different frames. The temporal characteristic value may be calculated in any manner discussed herein (by taking the arithmetic mean average of all of the contributing blocks of the other frames, taking a weighted arithmetic mean of those blocks, taking a minimum for those blocks, or taking a maximum for those blocks). Then, the pre-encoding analysis block 122 combines the temporal characteristic value with the initial quality value if no spatial filter has yet been applied or with the spatially filtered quality value if a spatial filter has been applied. An example of combining the temporal characteristic value with either the initial quality value or the spatially filtered quality value is by applying a weighted average. Specifically, the weighted average would sum the product of a constant alpha and the temporal characteristic value with the product of 1 minus alpha and either the spatially filtered quality value or the initial quality value. In some examples, the value alpha is a time constant that dampens the change over time. In another example, the value alpha is related to the correlation (measure of similarity) between the content (blocks) from which the temporal characteristic value and the content (blocks) from which either the spatially filtered quality value or the initial quality value is determined. A higher correlation would result in a higher alpha value, meaning that the temporal characteristic value would contribute to a greater degree than in the two pieces of content were not correlated as highly. An example technique for calculating correlation is calculating the sum of absolute differences of the luminance values of the two different pieces of content mentioned above. In an example, the value alpha has a minimum of 0 and a maximum of 1. In other examples, the value alpha has a different minimum and maximum value.

In various examples for modifying an initial quality value for a subject block based on characteristic values associated with contributing blocks, a spatial filter is first applied to the initial quality value based on contributing values of the current frame to obtain a spatially filtered quality value for the subject block. Then a temporal filter is applied to the spatially filtered quality value to obtain a final quality value. In other examples, only a spatial filter or only a temporal filter is applied. In yet other examples, a temporal filter is first applied and then a spatial filter is applied.

In the above description, the contributing blocks are those blocks determined to be part of the same object, whether through motion vector techniques or through object segmentation techniques. In an alternative implementation, contributing blocks could be limited to those blocks that are a within a certain radius of the subject block, so that distant blocks of a very large object would not affect the quality value of the subject block. In combination with that implementation, or as an alternative, in calculating the spatial characteristic value and/or temporal characteristic value, the weighted average technique described above is used, and the blocks are weighted based on distance to the subject block. For the frame of the subject block, the distance is the distance to the subject block. For temporally different frames, the distance is the distance to the position of the source pixels for the subject block.

Figure 5A:
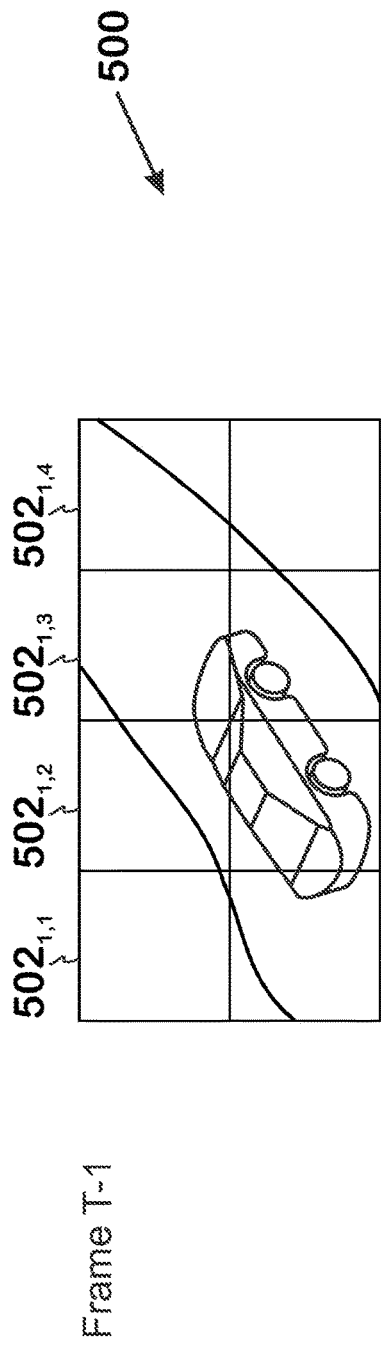
FIGS. 5A-5C illustrate an example application of a technique for modifying the quality value of a subject block based on contributing blocks.
Figure 5B:
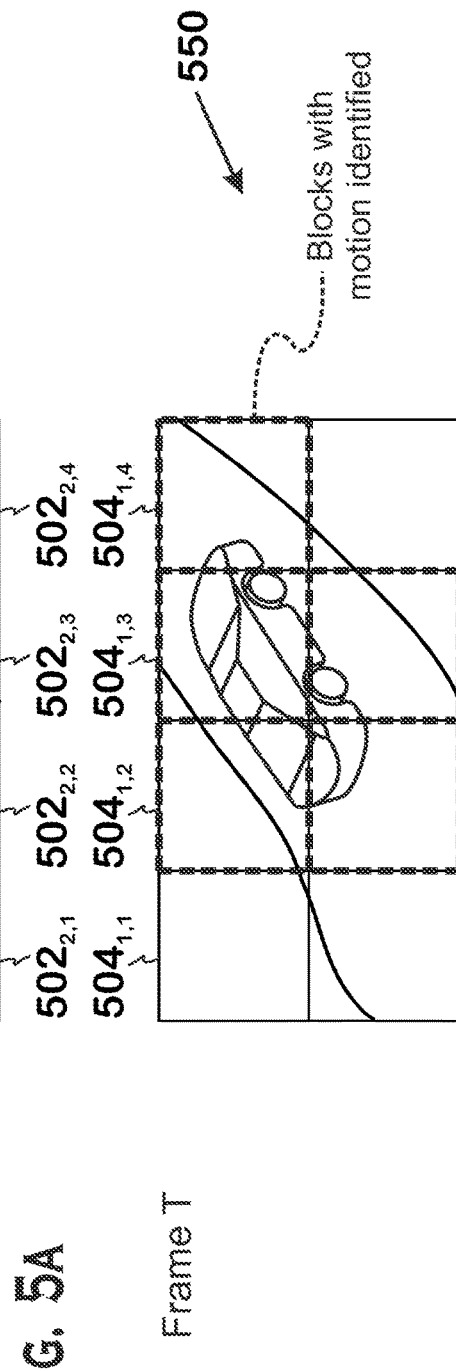
Figure 5C:
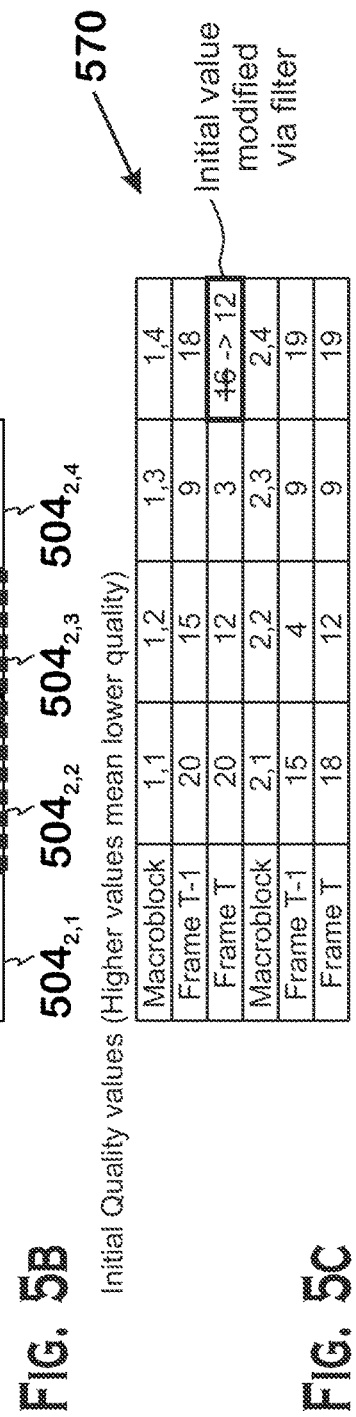

FIGS. 5A-5C illustrate an example application of a technique for modifying the quality value of a subject block based on contributing blocks. Frame T-1 500 is illustrated in FIG. 5A. Frame T 550 is illustrated in FIG. 5C. The car and road are positioned similarly to in FIGS. 3A and 3B.

In this scene, the pre-encoding analysis block 122 identifies the blocks with substantial motion, which are outlined with dotted lines. This identification can be done with any technically feasible method, including those described herein. The pre-encoding analysis block 122 identifies initial quality values for the blocks of the frames. The pre-encoding analysis block 122 performs the other steps of method 400 to obtain filtered quality values for the blocks. Any technically feasible means to obtain filtered quality values for the blocks, including those disclosed herein, may be used. In the example shown, the quality value for only one block is shown as modified. However, the techniques described herein may be applied to any of the blocks in the frames (such as the blocks including the car in frame T, and/or the blocks other than those blocks, if the background is moving, for example). As shown in chart 570, the filter adjusts the initial quality value of 16 for block 1,4 in frame T to 12, based on the quality values of the contributing blocks. The value of 12 is much closer to the quality values for the content of the car in frame T-1 (which is 9), than 16 is, and thus there is a less abrupt change in encoding quality for the car.

Figure 6A:
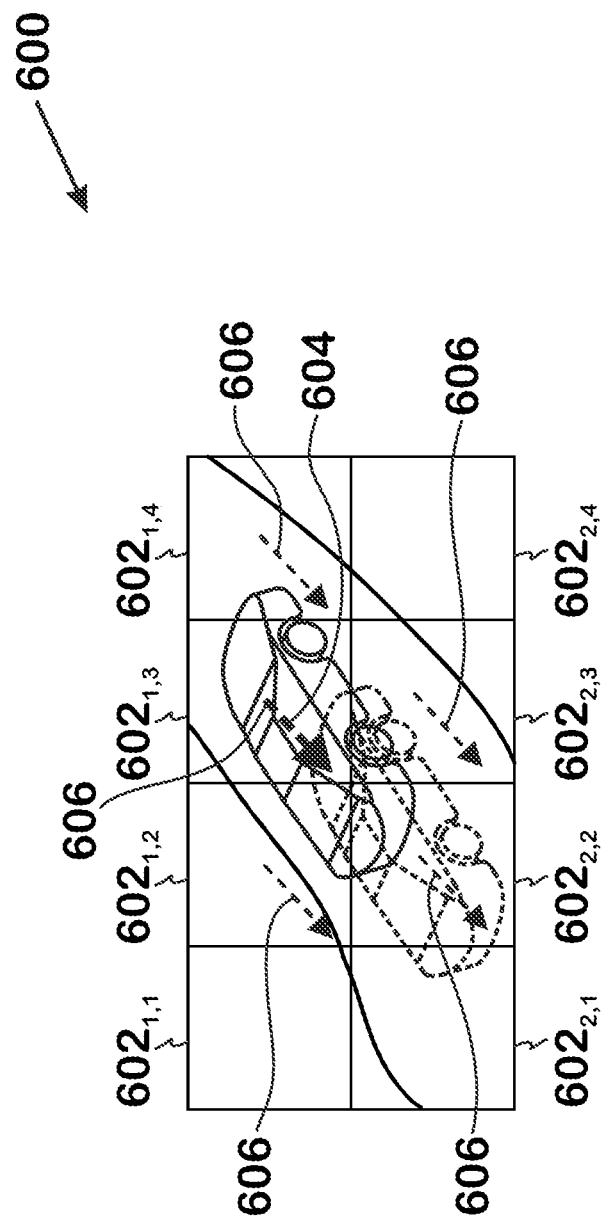
FIGS. 6A and 6B illustrate examples of techniques for identifying contributing blocks.
Figure 6B:
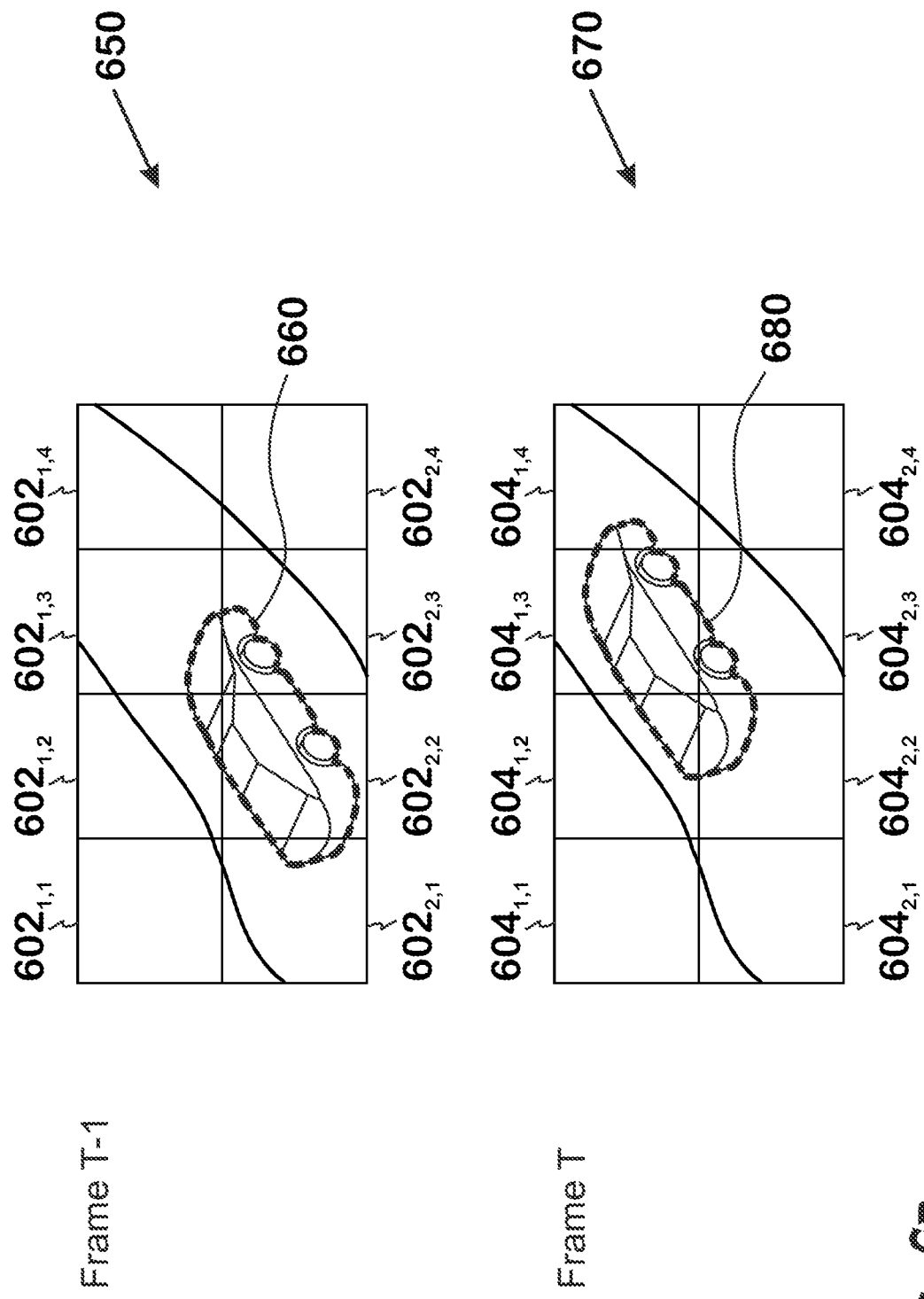

FIGS. 6A and 6B illustrate examples of techniques for identifying contributing blocks. FIG. 6A illustrates an example of identifying contributing blocks using motion vectors. The subject block is block $602_{1,3}$. The pre-encoding analysis block 122 identifies a motion vector 604 for the subject block. The pre-encoding analysis block 122 identifies contiguous blocks in frame T-1 (represented with dotted lines) having motion vectors 606 with similar to the motion vector 604, as the contributing blocks.

FIG. 6B illustrates an example of identifying contributing blocks using an object segmentation technique. Two frames are shown—frame T-1 650 and frame T 670. The subject block is block $604_{3,1}$ in frame T 670. An object segmentation technique identifies that an object identified by outline 660 in frame T-1 and by outline 680 in frame T exists in block $604_{3,1}$. Thus the pre-encoding analysis block 122 identifies, as the contributing blocks, all blocks that contain a portion of that outline in frame T-1 and in frame T, which includes blocks $602_{1,2}$, $602_{1,3}$, $602_{2,1}$, $602_{2,2}$, and $602_{2,3}$, in frame T-1, and blocks $604_{1,2}$, $604_{1,3}$, $604_{1,4}$, $604_{2,2}$, and $604_{2,3}$ in frame T.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for determining a filtered quality value for a block of a frame of video, the method comprising:
   determining an initial quality value for a subject block including an object;
   identifying one or more contributing blocks that include the object present in the subject block, wherein the one or more contributing blocks including the object are from one or more frames;
   identifying one or more quality values associated with the one or more contributing blocks including the object; and
   determining the filtered quality value for the subject block based on the determined initial quality value and the one or more quality values associated with the one or more contributing blocks, wherein determining the filtered quality value includes determining a characteristic quality value that is characteristic of quality values of the one or more contributing blocks including the object and adjusting the initial quality value for the subject block towards the characteristic quality value.

2. The method of claim 1, wherein the one or more contributing blocks including the object are from the same frame as the subject block.

3. The method of claim 2, wherein determining the filtered quality value comprises performing spatial filtering on the one or more quality values associated with the one or more contributing blocks including the object and the initial quality value.

4. The method of claim 3, wherein performing spatial filtering on the one or more quality values associated with the one or more contributing blocks including the object and the initial quality value comprises one of calculating an arithmetic mean of the contributing blocks to produce a spatial characteristic value, calculating a weighted arithmetic mean of the contributing blocks to produce a spatial characteristic value, calculating a minimum of the contributing blocks to produce a spatial characteristic value, or calculating a maximum of the contributing blocks to produce a spatial characteristic value.

5. The method of claim 1, wherein the one or more contributing blocks are from a different frame as the subject block.

6. The method of claim 5, wherein determining the filtered quality value comprises performing temporal filtering on the one or more quality values associated with the one or more contributing blocks and the initial quality value.

7. The method of claim 6, wherein performing temporal filtering on the one or more quality values associated with the one or more contributing blocks and the initial quality value comprises determining a temporal characteristic value for the one or more contributing blocks and mathematically combining the temporal characteristic value with the initial quality value.

8. The method of claim 1, wherein:
the one or more contributing blocks are from both the same frame and a different frame as the subject block; and
determining the filtered quality value comprises performing spatial filtering on the one or more quality values associated with the one or more contributing blocks and the initial quality value to obtain a spatially filtered quality value and performing temporal filtering on the one or more quality values associated with the one or more contributing blocks and the spatially filtered quality value.

9. The method of claim 1, further comprising:
determining that the subject block has substantial motion based on a motion vector of the subject block.

10. An encoder for encoding video, the encoder comprising:
a transform block, configured to convert pixels representative of a subject block into a transformed block, based on a filtered quality value; and
a pre-encoding analysis block configured to determine the quality value, by:
determining an initial quality value for the subject block including an object;
identifying that one or more contributing blocks that include the object present in the subject block, wherein the one or more contributing blocks including the object are from one or more frames;
identifying one or more quality values associated with the one or more contributing blocks including the object; and
determining the filtered quality value for the subject block based on the determined initial quality value and the one or more quality values associated with the one or more contributing blocks,
wherein determining the filtered quality value includes determining a characteristic quality value that is characteristic of quality values of the one or more contributing blocks including the object and adjusting the initial quality value for the subject block towards the characteristic quality value.

11. The encoder of claim 10, wherein the one or more contributing blocks including the object are from the same frame as the subject block.

12. The encoder of claim 11, wherein determining the filtered quality value comprises performing spatial filtering on the one or more quality values associated with the one or more contributing blocks including the object and the initial quality value.

13. The encoder of claim 12, wherein performing spatial filtering on the one or more quality values associated with the one or more contributing blocks including the object and the initial quality value comprises one of calculating an arithmetic mean of the contributing blocks to produce a spatial characteristic value, calculating a weighted arithmetic mean of the contributing blocks to produce a spatial characteristic value, calculating a minimum of the contributing blocks to produce a spatial characteristic value, or calculating a maximum of the contributing blocks to produce a spatial characteristic value.

14. The encoder of claim 10, wherein the one or more contributing blocks are from a different frame as the subject block.

15. The encoder of claim 14, wherein determining the filtered quality value comprises performing temporal filtering on the one or more quality values associated with the one or more contributing blocks and the initial quality value.

16. The encoder of claim 15, wherein performing temporal filtering on the one or more quality values associated with the one or more contributing blocks and the initial quality value comprises determining a temporal characteristic value for the one or more contributing blocks and mathematically combining the temporal characteristic value with the initial quality value.

17. The encoder of claim 10, wherein:
the one or more contributing blocks are from both the same frame and a different frame as the subject block; and
determining the filtered quality value comprises performing spatial filtering on the one or more quality values associated with the one or more contributing blocks and the initial quality value to obtain a spatially filtered quality value and performing temporal filtering on the one or more quality values associated with the one or more contributing blocks and the spatially filtered quality value.

18. The encoder of claim 10, wherein the pre-encoding analysis block is further configured to:
determine that the subject block has substantial motion based on a motion vector of the subject block.

19. A non-transitory computer-readable medium storing instructions that, when executed by a processor, cause the processor to encode video by:
determining an initial quality value for a subject block including an object;
identifying that one or more contributing blocks that include the object present in the subject block, wherein the one or more contributing blocks including the object are from one or more frames;
identifying one or more quality values associated with the one or more contributing blocks including the object; and
determining the filtered quality value for the subject block based on the determined initial quality value and the one or more quality values associated with the one or more contributing blocks, wherein determining the filtered quality value includes determining a characteristic quality value that is characteristic of quality values of the one or more contributing blocks including the object and adjusting the initial quality value for the subject block towards the characteristic quality value.

20. The non-transitory computer-readable medium of claim 19, wherein:
the one or more contributing blocks are from both the same frame and a different frame as the subject block; and
determining the filtered quality value comprises performing spatial filtering on the one or more quality values associated with the one or more contributing blocks and the initial quality value to obtain a spatially filtered quality value and performing temporal filtering on the one or more quality values associated with the one or more contributing blocks and the spatially filtered quality value.

* * * * *